Sept. 5, 1944. L. H. AMDUR 2,357,624
CINEMATOGRAPHIC METHOD AND DEVICE
Filed Oct. 10, 1939 2 Sheets-Sheet 1

INVENTOR

Sept. 5, 1944.  L. H. AMDUR  2,357,624
CINEMATOGRAPHIC METHOD AND DEVICE
Filed Oct. 10, 1939   2 Sheets-Sheet 2

INVENTOR
Lion H. Amdur

Patented Sept. 5, 1944

2,357,624

UNITED STATES PATENT OFFICE 2,357,624

CINEMATOGRAPHIC METHOD AND DEVICE

Leon H. Amdur, Brooklyn, N. Y.

Application October 10, 1939, Serial No. 298,746

48 Claims. (Cl. 88—16.6)

This invention relates to photographic methods, and devices used therewith, for the production of various types of photographic media, such as photographic prints, duplicated or reproduced prints or copies (by special printing surfaces used in such reproduction), and motion picture film. One of the objects of the invention is to improve the appearance of such photographic prints or printed copies, or the exhibition or projection on the screen of motion picture film; the appearance is improved in a number of respects, principally, in that the component parts and details of the picture stand out in remarkable relief and clarity. A second object of the invention is to give depth, or plasticity, or the effect of solidity or 3-dimensions, to the picture, or rather to component parts thereof.

For the attainment of these and such other objects as may herein appear or be pointed out, I have shown an embodiment of my invention in the accompanying drawings, wherein.

Figures 1, 2, 3, 3A, 5:
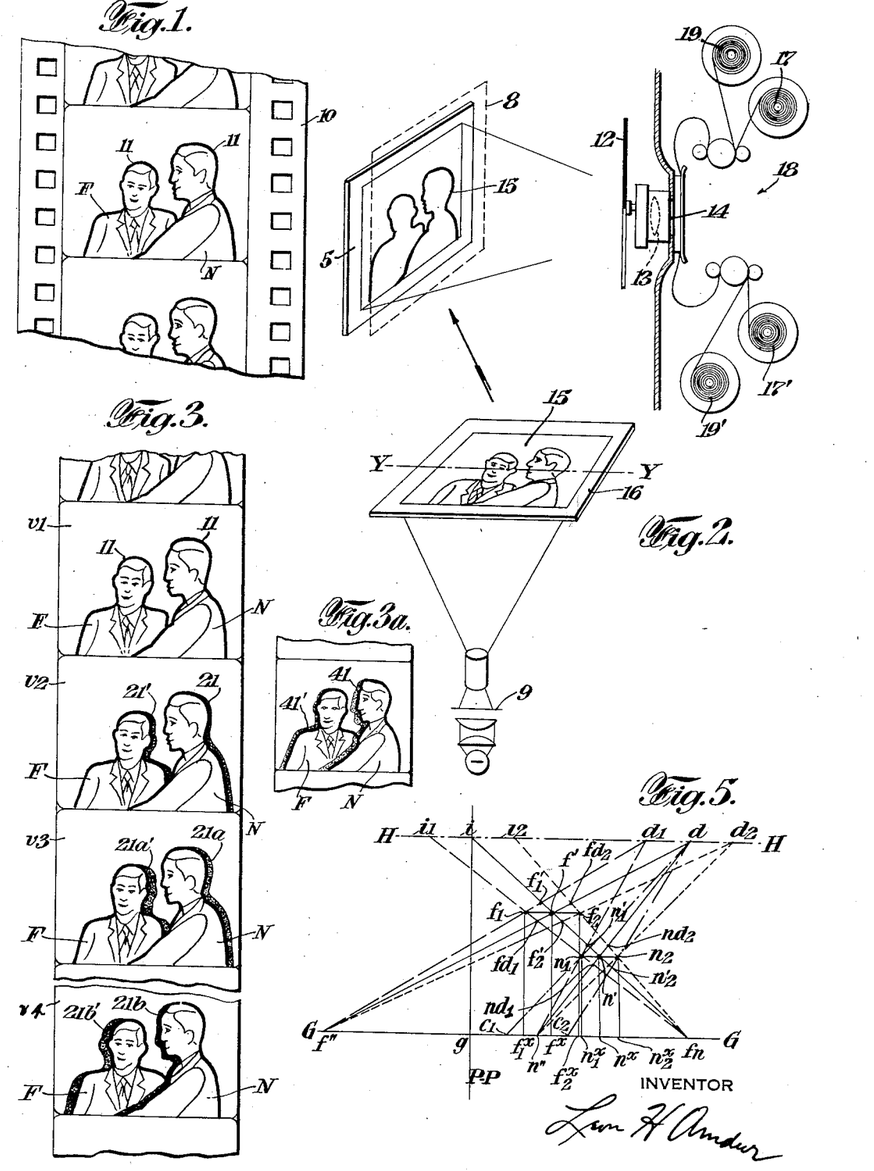
Fig. 1 is a piece of film showing the "verges"
Fig. 2 is a "flow diagram" to explain the method of producing the "verged" film of Fig. 1, and showing a special enlarging and projecting apparatus, a film printer etc.
Fig. 3 is a piece of film showing the "parallax-verges"
Fig. 3a illustrates "shadow-verges"
Figs. 4 and 5 are diagrams used in the explanation of underlying theories.

In Fig. 1 appears a piece of film 10 employed in one form of this invention. This film in its outward or physical aspects is no different from standard film and may be used in precisely the same manner in standard cameras and projectors; it has, as customary, a succession of picture frames consecutively arranged. The film differs, however, in one important innovation: Around the outline or border (silhouette) of some or all the figures or objects (in Fig. 1, around both figures or persons there shown) is a pronounced border or margin line 11. This distinct margin delineated around individual figures or objects or component parts I have termed a "verge line" or "verge." The verge is boldly circumscribed about component parts of the scene or view, in the manner of a "profile" or "silhouette." It will be observed from Fig. 1 that the verge is completely circumscribed about the near figure N; in the case of the far figure F, the verge does not appear where portions of the far object is obscured by the near figure.

Only motion picture film has been illustrated. The invention is applicable, however, to all forms of photographic media, whether camera prints, printed copies of photographs (half-tones or line-cuts) made by any reproductive process (relief, planographic or intaglio printing), etc. In all such cases the pictures and copies present verges circumscribed about component parts of the picture in the manner explained in connection with Fig. 1.

One method of circumscribing the component parts of the frame view of the film with verges (11) will be described with the aid of Fig. 2. The film is taken in the usual manner by a standard motion picture camera; from the negative, after editing and cutting, is produced the final "picture positive," in the customary procedure of the motion picture industry. After the positive has been approved by the officials for whose benefit the positive film is projected, a "master negative" is made (from which are usually made several duplicate negatives or "dup-negatives"). The verges are introduced after the said "picture positive" has been completed (and prior to the making of the master negative), or rather, at the same time as the master negative is made.

The picture positive, designated 9, is enlarged and projected upon the underside of a ground glass surface 16, conveniently oriented horizontally as a table. Upon the ground glass table is placed a piece of tracing paper upon which is traced the verge or outline around the component parts (objects or figures) of the projected and enlarged view frame of the film; the tracing with the verge or verges traced thereon I have termed the "verge tracing" and designated 15 in Fig. 2. The amount of enlargement is dictated by the requirements of the person tracing the verges around the outlines of the view figures or component parts. In one form of the invention, the verges are executed in rather bold firm lines of uniform thickness (these considerations will be again discussed hereinafter in connection with other forms or modifications of the invention).

From the picture positive film 9 and its series of verge tracings 15 is made the master negative. This is done in a modified contact printer designated generally 18. Virgin negative film is placed on the negative supply reel 17 and the picture positive 9 is placed on the positive supply reel 19. Both films are drawn in contact through the machine, to be respectively accumulated on the negative take-up 17' and the positive take-up 19'. The picture positive lies in front of the negative film, at the aperture 14. At the aperture I provide a suitable lens combination 13. Character 12 designates the shutter of the printer. In front of the printer is provided a support or reflecting surface 5 upon which is placed the verge tracings 15. Intense lights, diagrammatically shown at 8, are placed to throw uniform, strong light upon the tracings. This light reflected from the tracing and support 5 is ample for the requirements of the contact printer, especially since the tracings are practically all white with very little markings thereon, so that there is a high degree of light reflection into the printer. The lens combination 13 focuses the verges of the tracings upon the film, so that both the negative of the picture positive and of the verge tracings are received upon the negative film; the verge lines are, of course, in delineating or circumscribing relation to their respective figures or component parts.

The "verge tracing frames," by which is meant the verge tracings corresponding to respective view frames of the film, may be drawn on a continuous web or sheet or sheets of tracing paper. The verge tracing frames, whether as separate frames or as a continuous web, may be automatically fed through the printer, and also past the ground glass top 16.

This method, and the special apparatus shown in Fig. 2, may be used in the production of negatives for other photographic media, e. g., negatives from which a print or prints may be made, and negatives used in the making of printing surfaces of any kind (relief, planographic intaglio) etc. The positive film or transparent plate is inserted in the enlarger or projector instead of motion picture film 9; instead of motion picture film, a negative plate is placed back of the aperture 14 with the transparent positive in front of the negative. The verges may in such cases be directly traced on the negative or on the prints or printed copies.

Instead of simultaneously printing the picture positive upon the negative and exposing the verge tracing to the negative, this might be done in steps (or by "double exposure"), that is, impressing the picture and the verge separately upon the negative.

All the view frames of the film may have verges therein, or only some of the view frames, e. g., alternating ones, may be delineated. All the component parts, such as objects, figures, persons, etc., of a view frame may be delineated or only some of the component parts, e. g., the more prominent or important ones, may be delineated. There ay be an inter-relation between both factors, viz., the frames and component parts, so that in some frames, some of the component parts may be delineated while other parts are delineated in other of the view frames.

The verges circumscribing all component parts of a view frame may be identical in thickness of the verge line and in its density of opacity. Thickness and opacity of line may be varied according to the distance of the component parts from the camera. To the two inter-related factors (viz., the view frames and the component parts) above mentioned, may be added the further factors of thickness of verge line, opacity of verge line, and the distance of the component parts.

Figures 4, 6, 7, 8, 9, 10, 11:
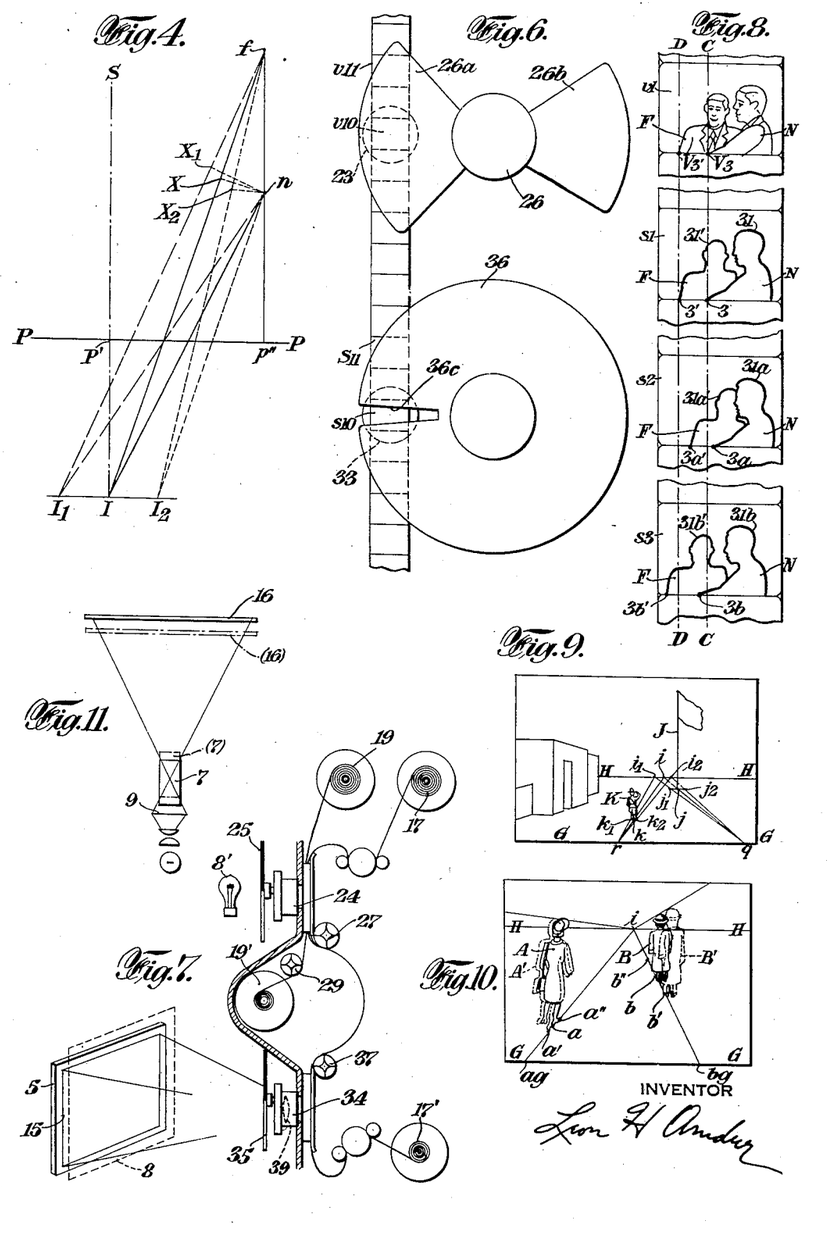
Fig. 6 shows a projector for exhibiting film having "stereo" or "verge" frames.
Fig. 7 shows a special printer for producing film having "verge" or "stereo" frames and related view frames.
Fig. 8 is a piece of film showing "stereo" frames.
Fig. 9 shows how the range of vibration and other information may be derived from the picture itself.
Fig. 10 is a piece of film showing a "normal-stereo" frame.
Fig. 11 illustrates a device, and method, for making "normal-stereo" frames.

The verge lines, in the form of the invention now to be described, are modified in accordance with the distances of the respective component parts from the camera and from each other and based upon the principles of parallax. By parallax is meant the apparent displacement of an object due to the real displacement of the observer. Referring to Fig. 4, if the observer moves to the right from $I_1$ to $I_2$, $n$ (near object) will appear to be displaced to the left with reference to $f$ (far object), or, what is the same thing, far object $f$ appears to move rightward with reference to the near object $n$.

Instead of being of uniform thickness as shown in Fig. 1, the verges, or rather the "parallax verges" as they may now be called, are of different thicknesses, depending principally upon the distances of the objects from the camera, as shown in Fig. 3. In view frame $v1$ of Fig. 3, the near (N) and far (F) figures appear with uniform width verges 11. In view frame $v2$ the parallax-verges are widened towards the right, the increase of thickness being greater in the verge 21' of the far figure F than in the verge 21 of the near object. In the succeeding view frame $v3$ the parallax-verges 21a are still further widened towards the right, the thickness of the far object's verge 21a' increasing more rapidly than that (21a) of the near object. The parallax-verges are widened progressively toward the right (as in frames $v2$ and $v3$) and then progressively toward the left (see parallax-verges 21b and 21b' in view $v4$). There is thus a left-to-right and right-to-left displacement or vibration of the parallax-verges. Throughout the parallax-verge vibration, the width of the verges, or, in other words, the range of vibration thereof, depends upon the distance of the object from the camera. For example, in Fig. 3, the range of vibration of the verge of the far object F from its extreme rightward position 21a', view frame $v3$, to its extreme leftward position 21b', view frame $v4$, is greater than the corresponding range of verge vibration of the near object N, from 21a to 21b.

Suppose a full second—which is exceedingly short, but making for ease in exposition—is assigned for the contemplation of a scene. This means that 24 view frames are available during that time. Hence the left-and-right vibration of the parallax-verges may be consumated in 24 steps, or, instead of a single parallactic vibration, there may be a number of complete (right and left) vibrations. For example, during the time assumed (one second) there may be, say, 3 vibrations (i. e. 8 frames for a single vibration, 4 to the left, and 4 to the right). Of course, these figures are merely given for illustrative purposes, the actual operation depending upon many factors, such as the nature of the scene, the number of objects therein, their distances and importance, time available for contemplation, etc. Not all the parallax-verges (i. e. of various objects) need be vibrated at the same time; there may be different series of vibrations; these may alternate with each other.

The theory underlying the system of parallax-verge vibrations may be explained with the aid of Figs. 4 and 5. Referring first to Fig. 4 and continuing the above discussion of the phenomenon of parallax, the object which is nearer ($n$) the observer ($I$) seems to be displaced in a direction opposite to the motion of the observer while the far object ($f$) seems to move in the same direction as the observer. For example when the observer is at $I_1$, near object $n$ appears to be the distance $X_1n$ to the right of far object $f$; when the observer has moved rightward to $I_2$, near object $n$ now appears to be the shorter distance $X_2n$ to the right of $f$. Near object $n$, now appearing to be nearer $f$, seems to have moved towards the left, i. e. in a direction opposite to the rightward movement of the observer, or, what is the same thing, far object $f$ seems to have moved towards the right, i. e. in the same direction as the observer.

Fig. 4 is a plane geometric view of the objects $f$ and $n$ and observer $I$. Suppose P—P is the trace of a vertical plane which will be the "plane of the picture." The line of sight is from observer $I$ along line I—S, normal to the picture plane P—P. In Fig. 5 is shown the actual appearance of points $f$ and $n$ shown in their true perspective seen in picture plane P—P from station $I$ Fig. 4, and at distance $IP'$, Fig. 4, from the plane of the picture. In Fig. 5, GG represents the ground or base line (made by the intersection of the vertical picture plane P—P with a horizontal datum plane of objects $f$ and $n$ Fig. 4) and H—H represents the horizon containing the vertical projection $i$ (called the principal point) of the point of sight $I$, which is thus the vertical distance $ig$ above the horizontal plane (i. e. ground line GG). The perspective positions $f'$, $n'$ of objects $f$ and $n$ are gotten in an orthodox manner: For ease in illustration $f$ and $n$, Fig. 4, are assumed to be an equal distance from the line of sight I—S and, as mentioned above, in the horizontal plane of Fig. 4. Hence the orthograph position of both objects $f$ and $n$ will be the single point $fn$, Fig. 5, i. e. in the ground line, the distance $g$—$fn$ being equal to the distance of objects $f$ and $n$ from the line of sight I—S, Fig. 4. The distance point $d$ is spotted on the horizon HH, the distance $id$ being equal to the distance I—P', i. e. the distance the observer is from the picture plane P—P. On the base line G—G is spotted point $n''$ equal to the distance of near object $n$ from the picture plane PP, Fig. 4 ($n''$—$fn$, Fig. 5, equals $n$—P'' Fig. 4) and point $f''$ equal to the distance of far object $f$ from picture plane PP ($f''$—$fn$, Fig. 5, equals $f$—P'', Fig. 4). Point $fn$ is joined by a straight line to $i$; point $n''$ is joined by a straight line to $d$. The intersection $n'$ is the perspective position of near object $n$. In like manner, perspective position $f'$ of the far object $f$, is found.

That is, to observer at $I$, Fig. 4, the objects would appear to be at $n'$ and $f'$, Fig. 5. Suppose now that the observer moves from $I$ rightward to $I_2$. The principal point $i$ moves rightward the same amount to $i_2$, Fig. 5. Inasmuch as $I_2$ is still the same distance from the picture plane, P—P, Fig. 4, the distance point likewise moves the same amount rightward to $d_2$ ($id$ being equal to $i_2d_2$). By joining new points $i_2$ and $d_2$ with $fn$ and $f''$, respectively, the new perspective position $f_2$ of far object $f$ may be found. In the same way is found the new perspective point $n_2$ of the near object $n$.

That is, when the observer moves from $I$ rightward to $I_2$, the objects now appear at $f_2$ and $n_2$. On the other hand, if the observer moves an equal distance leftward to $I_1$, Fig. 4, the perspective points would be at $f_1$ and $n_1$.

Comparing Fig. 5 with Fig. 4 we see that as the observer moves rightward from $I_1$ to $I_2$ ($i_1$ to $i_2$) near object $n$ seems to move leftward relative to far object (as above explained near object seems to be displaced in a direction opposite to the movement of the observer; $nX_2$ is less than $nX_1$, Fig. 4). Relatively speaking, the far object $f$ seems to move rightward with respect to the near object $n$, for the same reason, viz., $nX_2$ is less than $nX_1$.

The movement of the observer rightward from $I$ to $I_2$, Fig. 4, is a movement towards the two objects, $f$ and $n$, under observation. Hence, it may be summarized that, when the observer approaches two objects, one of which is nearer to the picture plane than is the other, the objects appear to move towards each other. This is seen in Fig. 4; $X_2n$ is less than $Xn$. This also is seen in Fig. 5; to more readily see that the perspective points $f'$ and $n'$ move toward each other as the observer approaches them (moving rightward), i. e. that $n_2$ and $f_2$ are closer together than are $n'$ and $f'$, perpendiculars have been dropped from $n'$, $f'$, $n_2$ and $f_2$ to points, respectively, $n^\times$, $f^\times$, $n_2^\times$ and $f_2^\times$ on ground line GG. From these latter points it is readily seen that the perspective points $n'$ and $f'$ appear to approach each other, distance $n_2^\times f_2^\times$ being less than distance $n^\times f^\times$.

On the other hand, if the observer moves leftward to $I_1$, Fig. 4, i. e., away from the two objects $n$ and $f$, the near object $n$ appears to move to the right (or, far object $f$ appears to move to the left), the distance $nX_1$ being greater than the distance $nX$, Fig. 4. That is, the objects appear to spread apart. This also is seen in Fig. 5 where $f_1n_1$ are further apart than $f'n'$; $n_1^\times f_1^\times$ is greater than $n^\times f^\times$.

$f_1f_2$, Fig. 5, is the range of parallax-verge vibration of the far object $f$ (Fig. 4) or the far object $F$ (Fig. 3), whereas $n_1n_2$ is the range of parallax-verge vibration of near object $n$ (Fig. 4) or near object $N$ (Fig. 3), both, of course, grossly exaggerated. It will be observed that $f_1f_2$ is greater than $n_1n_2$; i. e., the far object has a greater range of parallax-verge vibration.

Of course, in a picture, such as a motion picture frame, the objects or images cannot be relatively shifted. I accomplish the effect of parallactic displacement of objects (in accordance with their spatial positions)—and thus get the effect of solidity or 3-dimensions—by parallactic control of the verges of the different objects spatially considered. The distance $f'f_2$ is the (grossly exaggerated) width of the rightward parallax-verge of the far object $f$, whereas $n'n_2$ is the rightward parallax-verge of the near object $n$. We have seen above that as the observer moves toward the objects, they appear to approach each other. By making the parallax-verge of the far object $f$ wider than the parallax-verge of the near object $n$, the effect is an approaching of the two objects $f$ and $n$ when the observer moves toward them; the extreme rightward points of the verges are $f_2$ and $n_2$, see Fig. 5. As above demonstrated, $f_2n_2$ are nearer together than $f'n'$ (i. e., the extreme rightward points of the objects themselves).

The distance $f'f_1$ is the width of the leftward parallax-verge of the far object $f$ and $n'n_1$ is the leftward parallax-verge of the near object $n$. As the observer moves leftward (to $I_1$, Fig. 4), i. e., away from the objects, the objects appear to spread apart. In this case (that is, retreat of the observer from the objects) the effect of a wider parallax-verge for the far object is an apparent spreading apart of the two objects; the extreme leftward points of the verges are $f_1$ and $n_1$, see Fig. 5. As above demonstrated, $n_1f_1$ are further apart than $f'n'$ (i. e., the extreme leftward points of the objects themselves). The extent of apparent movement, towards or away from each other, depends chiefly upon the distance separating the objects—i. e. their spatial disposition—as can readily be seen from Fig. 5.

It will be observed from Fig. 3 that the parallax-verges do not encroach upon the object or figure (component part) of which they constitute the outline or periphery; that is, the verge is congruent with the object. Whatever increased width is given to the parallax-verge is outwardly, to one side or the other. The verges do not affect the visualization of the scene or view, i. e., of the component parts, for the reason, firstly, that the verges serve to accentuate or delineate the figures and objects and thus tend to make them even clear or bolder. The increased width of the parallax-verges is but a small percentage of the figure or object, and, as just pointed out, extend outwardly of the object, and do not encroach upon the object itself. (However, it should be noted that the parallax-verge of a near figure, such as verge $21b$ of figure N of view frame $v4$, Fig. 3 may encroach upon far objects which are behind it, such as far figure F.)

A further reason why the parallax-verges do not hinder visualization of the picture is that, whereas the picture itself, or rather component parts, remains steadily before the eyes (because of persistence of vision), the parallax-verges are continuously shifting from one frame to the next in the course of their vibration. The parallax-verges are not seen as such; they merely have the effect of giving plasticity or solidity to the picture, or rather the component parts with which they are associated.

The parallax-verges are only momentarily flashed upon the screen. For this reason the parallax-verges need not be present in every contiguous succeeding frame; i. e., they may appear in a suitable alternating arrangement or sequence. A variation may be introduced in this alternation or sequence, depending upon particular component parts; i. e., all the component parts need not be vibrated in unison, nor need they all be shifted or presented in contiguous frames.

In addition to control of width of the verges, these may be controlled, also in accordance with spatial disposition, as to the density or opacity of the lines. That is, the density or opacity of the verges of near objects would be more pronounced, bold and sharp than the verges of far objects, the latter reducing to vagueness as the object recedes in the distance.

It may here be observed that the same phenomenon of parallax which is here employed to give the effect of three dimensions to the pictures, is constantly used in everyday life to aid the senses in judging distance. For example, a person will shift his position slightly when endeavoring to gauge the distance separating two objects. In fact, parallactic displacement or vibration (e. g., of the observer between $I_1$ and $I_2$, Fig. 4) forms part of the underlying principle of this form of the invention. Of course, this vibration is at a very high rate and not the slow, deliberate shifting of the head of an observer.

The system of parallax-verges might be considered from another aspect, namely, that of binocular vision by which the eyes perceive an object from two separate view-points; one of the eyes sees the object and a particular portion of the background beyond the object, while the other eye sees the object against a somewhat different background. The system of parallax-verges also results in a shifting or change of the background relative to an object or objects in the foreground. Referring to $v2$ of Fig. 3, the far object F might be considered to constitute the background for the near object N. At the instant represented by $v2$, this background is that represented by F with the particular verge $21'$ shown in that frame. In the next instance, which might be that shown in $v3$, the background, i. e., figure F plus its verge $21a'$ of increased width compared to $21'$, has changed. That is, near figure N is now viewed against a different or changed background. It is noteworthy to observe that the extent of change of the background depends upon the distance the object or things constituting the background is removed from the camera, or rather from the foreground object. This is a consequence of the fact, already explained, that the range of parallax-verge pulsation or widening depends upon the distance from the camera. That is, if the background represented by F, Fig. 3, were further removed, the amount of change or shifting would be more pronounced. That is precisely what occurs in binocular vision; the further removed is the background from an object the greater is the difference in the background (relative to the foreground object) as received by each eye.

The view frames of the film may be given parallax-verges by a method similar to that above explained (with the aid of Fig. 2) with reference to ordinary verges. The positive film 9 is enlarged and projected on the underside of ground glass top 16. A tracing is made of thin (uniform width) verges around all the component parts (at least, all of them which are to have parallax-verges); this tracing will be termed the "master tracing" as it is used in the forming of the other parallax-verge tracings of the series. The said "master tracing" is used directly—by being placed before surface 5 and exposed to the film as explained above—to form one of the series, which may be, for example, frame $v1$, Fig. 3. The master tracing might also be called the "central position" tracing, as in it the verges are centrally positioned, i. e., precisely coincidental or congruent with the component parts themselves.

The master tracing is also used in constructing the other parallax-verge tracings of the series, thus: Directly over the master tracing is placed a fresh sheet or portion of tracing paper and both the master tracing and the fresh tracing are centered with respect to the enlarged projected view (of the film frame). Upon the fresh tracing is traced the outlines that appear in the master tracing (the fresh tracing, at least in this stage, is thus far identical with the master tracing). Of course, duplicate tracings may be simultaneously prepared for the whole series. Maintaining the fresh tracing in centered position, the master tracing is shifted an amount to one side, say, to the right, depending upon the width of the parallax-verge of one of the objects, say, the near object N, Fig. 3. Upon the fresh tracing is traced the right portion of the near object N as it now appears on the rightwardly-shifted master tracing.

There thus appears on the fresh tracing, a complete "verge outline" of near object N plus a double verge line of it rightmost perimeter displaced a small extent to the right. The two right verge lines are filled in to form the right parallax-verge 21 of view frame $v2$, Fig. 3, of the proper thickness. Of course, by using appropriate pencils and other drawing instruments (particularly, of the proper width), the right parallax-verge may be directly traced or drawn in to the right of the verge outline.

The master tracing, still keeping the fresh tracing centered, is now shifted, again rightwardly, an amount depending upon the thickness of the parallax-verge of the other object F— the parallax-verge 21' of the far object F being wider than the parallax-verge 21 of the near object N (since further removed from the observer), the master tracing is shifted a greater extent rightward. The right parallax-verge 21' of the far object is drawn in the manner above outlined with respect of object N.

The fresh tracing thus becomes the second parallax-verge tracing of the series. It is placed against stand 5, Fig. 2, and together with the correlated or corresponding view frame of the picture positive film, forms the corresponding completed (i. e., with parallax-verges) frame of the master negative film.

In the same manner is formed the third and succeeding verge tracings of the series and the completed frames of the master negative. In each case, the master tracing is shifted an extent with respect to each component part of the view depending upon the spatial position of the component parts. The parallax-verges are progressively widened (always extents depending upon spatial disposition) first in one direction and then, progressively, in the opposite direction.

It will be observed from Fig. 5—that the line $f_2 f_1$ is parallel to the line $n_2 n_1$. It may be proved by Euclidian geometry that, given two parallel lines (such as HH and GG Fig. 5), where intersecting or crossing lines are drawn from spaced points on one of the parallel lines (such as points $f''$ and $fn$ on line GG) to two pairs of spaced points on the other line (such as points $i_1$ and $i_2$ and points $d_1$ and $d_2$ on line HH), that, if the respective pairs of points are equally spaced, i. e., $i_1 i_2$ equals $d_1 d_2$, the line joining the two intersecting points $f_1$ (at the intersection of lines $f''$—$d_1$ and $fn$—$i_1$ and $f_2$ (at the intersection of lines $f''$—$d_2$ and $fn$—$i_2$) will be parallel to the said two parallel lines.

Therefore, the master tracing may be shifted in a direction parallel to the top and bottom borders of the projected view frames, Fig. 2, i. e., in the direction of line Y—Y.

The extent of parallax-verge vibration, i. e., the maximum width of the parallax-verge (on each side), depends, as already seen and demonstrated, upon the distance of the object from the camera. The distance of the various objects from the camera may be roughly approximated from the view frame (film) itself, or rather from its projected showing (as on ground glass screen 16, Fig. 2). Often, receding distances are difficult to determine from the picture itself; hence, such distances might be noted down by the camera-man by direct measurement or approximation at the scene, and used as a guide by the tracer in making the various parallax-verge tracings. The extent of parallactic vibration may also be determined from an exact geometric or perspective consideration of the picture (this will be more fully considered subsequently).

A "series" may be defined as the number of view frames of the film projected for the contemplation of a view or scene, during which there is substantially no shifting of the component part or parts, either as to position or as to posture. Assuming as before that a second is allotted to the contemplation of a scene in which there is substantially no component shifting, and, at a film speed of 24 frames per sec., there is thus 24 frames in the "series." As explained above, a single complete parallax-verge vibration may be consummated in the 24 frames, or a number of complete vibrations may take place during this time, say, for example, three complete vibrations, each of which will be termed a "vibration-series." Each of the three vibration-series of the example considered comprises 8 frames.

As explained above, a master tracing is used as the basis or stereotype for making other verge tracings. In fact, the master tracing may be used for the making of all the verge tracings of a series or set of vibration-series. Each succeeding verge tracing, of course, pertains to a particular succeeding view frame. The master tracing is continuously checked against succeeding view frames for congruence or identity of verge outlines and their respective component parts of the picture. If the change of a component part, either as to posture (i. e., inherent outline) or position (i. e., relative to other parts), becomes considerable, either the master tracing must be re-vamped to note the change or a new master tracing must be made. The revamped or new tracing may continue in the old "series" or a new series may be started.

Instead of incorporating the verges or parallax-verges directly on the view frames (as in Fig. 1 and Fig. 3), separate frames of the film may be assigned for verge or parallax-verge exhibiting or flashing upon the screen. In this aspect of the invention is employed a projecting machine having two projecting apertures and objectives, an upper aperture 23, Fig. 6, and a lower aperture 33. Cooperative with the upper and lower objectives are an upper shutter 26 and a lower shutter 36, rotating synchronously, conveniently assumed to be in the same direction and counter-clockwise as viewed in Fig. 6. Alternately arranged on the film are two series of frames, one, the usual picture or view frames, the other, frames to which I have given the name of "verge" frames and which embody the verges. The "view frames" and the "verge frames" are alternately arranged on the film, there being one verge frame associated with each view frame; one of the series is shifted a number of frames ahead of the other, depending upon the distance between upper and lower apertures. The projection of a view frame (e. g. "$v10$," Fig. 6, the "$v$" standing for "view") is followed by the projection of a verge frame (i. e., "$s10$," Fig. 6); the projection continuing thus, $v11$, $s11$, $v12$, $s12$, etc. The view or ordinary frames are projected at the upper aperture 23, which may be referred to as the "view aperture;" it is controlled by "view shutter" 26. The lower or "verge aperture" 33 is controlled by "verge shutter" 36.

The view shutter 26 is of the standard two-way type having an obscuring wing 26a of wider angle and an anti-flicker wing 26b of narrower angle. The verge shutter 36 comprises mostly a disc having a very narrow cut-out 36c. By this arrangement there is provided a relatively long view frame exhibition and a very brief exhibition, or rather a momentary flashing, of the verge frame. The slit or cut-out 36c of the verge shutter passes the verge aperture 33 during the time the view aperture 23 is obscured by wing 26a of the view shutter 26.

During the time that the upper or view aperture 23 is obscured, the film at the aperture 23 is given an intermittent movement of two frames to bring the succeeding frame, which is $v11$, in position at aperture 23. During the showing of the view frame (e. g. $v11$) the lower or verge aperture 33 is obscured by the shutter 36; during this time, the film at aperture 33 is given a two frame advancement to bring the succeeding verge frame, which is $s11$, at aperture 33.

It is thus seen that the ordinary view frames are given their usual exhibition on the screen. But during the "dark" period of the screen, there is momentarily flashed the correlated verge frame, the verge outlines of which register or coalesce with the images of the objects or component parts of the view with which they are associated (by reason of persistency of vision). Instead of a single slit or cut-out 36c there may be two or more such slits so that there may be more than one flashing or exhibiting of the verge frame for each exhibition of the view frame.

The "duplex" film, namely, film having alternately arranged series of view frames and verge frames, may be made in a manner similar to that described in connection with film with verges directly incorporated in the view frames. (See Fig. 2.) A contact printer for this purpose is shown in Fig. 7. Virgin negative film is supplied at supply reel 17 and the picture positive film, at supply reel 19; both films are fed together past an upper aperture 24 provided with a shutter 25, before which is the light source 8'. The negative and positive film are simultaneously advanced past the upper aperture; the positive film (having successive view frames) is advanced one frame at a time, by intermittent mechanism 29 while the virgin negative film is advanced two frames at a time by intermittent mechanism 27. During the stand-still phase of the film cycle, shutter 25 permits light to pass through upper aperture 24 to cause a printing of the successive view frames of the picture positive upon the alternate frames of the negative film. The positive film is taken up at 19'.

The negative film, however, continues past lower aperture 34, which is provided with lens combination 39 which focuses the verge tracing 15, supported on stand 5 and lighted by lamps 8, upon the film; this exposure is controlled by shutter 35. The negative film is intermittently moved two frames at a time past the lower aperture 34 by intermittent mechanism 37. Alternate frames, i. e., those which have not been printed at the upper aperture, are thus exposed at the lower aperture and become the "verge frames" corresponding to the view frames printed at the upper aperture. The negative film is taken up at 17'.

The verges or parallax-verges are characterized by the fact that they are congruous with the outlines of the component picture parts to which they pertain and are never detached therefrom, i. e., the verges and figure-outlines are always in register (of course, there is the widening of one or the other side edges or outlines to form the parallax-verges, but the inner edges or outline of the parallax-verge remains congruent with the periphery of the figure). In another form of the invention, detachable outlines are formed circumscribing the periphery of objects and figures; these outlines I shall term "stereo outlines" or "stereos" to distinguish from the verges or parallax-verges. The stereos may be formed on separate frames—like the verges—also alternately arranged; these frames are termed "stereo frames." In Fig. 8 is shown a number of stereo frames $s1$, $s2$, $s3$ and a single view frame $v1$.

The stereos, such as the stereo 31 of the near figure N and stereo 31' of the far figure F, see $s1$, Fig. 8, are similar to the verges (e. g., 11 and 11', $v1$ of Fig. 3)—but dissimilar to the parallax-verges (e. g. 21 and 21', $v2$, $v3$, Fig. 3)—in that they (the stereos) are formed of uniformly thick lines, the stereos having no increased width of lines like the parallax-verges. The stereos differ from the verges or parallax-verges in that the stereos are not constantly congruent or coincidental with the objects or figures to which they pertain. The stereos are bodily shifted—to one side or the other—and thus became detached from the figures of which they constitute outlines.

The stereos, like the parallax-verges, are given a left-right (or right-left) vibration in "series" and "vibration series" as defined above. In the first of a particular series, such as stereo frame $s1$, Fig. 8, the stereos coincide or register precisely with the figures to which they pertain; i. e., stereo 31 of near figure N, frame $s1$, will coincide or register with the projection of near figure N, view frame $v1$; so will stereo 31' of the far object F. To indicate this fact of congruence, dot-and-dash parallel lines C—C and D—D have been drawn down the length of the film. From these it will be seen that the near figure N cuts the bottom line of the view frame ($v1$) at V3 and that the far figure F cuts the bottom line of the frame at V3'. Point V3 lies on line C—C and point V3' lies on line D—D. In the first of the series, $s1$, the stereos are congruent with their objects. Stereo 31 of near object N intersects the bottom line of the stereo frame at 3 and the stereo 31' of far object F intersects this line at 3'. Inasmuch as the stereos are congruent, point 3 lies on line C—C and point 3' lies on line D—D; i. e., points 3 and 3' are spaced the same distances from the side of the frame as are the corresponding points V3 and V3'. In the next of the series, such as $s2$, Fig. 8, the stereos are shifted to one side or the other (rightward in Fig. 8). Stereo 31$a$ of near object N intersects the bottom frame line at 3$a$; stereo 31$a$' of far object F intersects this line at 3$a$'. Both 3$a$ and 3$a$' are to the right of lines C—C and D—D respectively.

As in the case of the parallax-verges, the extent of shifting depends upon the distance of the objects from the observer or plane of the picture. Figs. 4 and 5 apply equally well here. Hence stereo 31$a$ of the near object N is shifted less to the right than is stereo 31$a$' of far object F; it can be readily observed from $s2$, Fig. 8, that point 3$a$ of N is nearer its line C—C than is point 3$a$' to its line D—D. The vibration, as in the case of the parallax-verge, is to both sides of central object position; in $s3$, Fig. 8, the stereos are shifted to the left.

The verges or parallax-verges are dark lines or delineations circumscribing the objects to which they pertain (this is so in both the case where the verges or parallax-verges are directly incorporated in the picture frame, and in the case where separate verge frames are employed and the verge and picture registered on the screen). The stereos, likewise, may be dark lines; it is preferred, however, that the stereo be flashed upon the screen as light flashes, i. e. the stereo frame is quite similar to a stencil, with an opaque body in which thin lines have been cut out to form the stereos, which appear momentarily on the screen as thin lines of light. These stereo flashes the spectator does not, at least not consciously, see as such; the lines or flashes fuse into or coalesce with the objects to which they pertain, giving them and the picture as a whole the effect of solidity or plasticity.

The film, containing view and stereo frames, is projected upon the screen by means of a two-aperture projector, see Fig. 6, which was described in connection with the projection of film having verge frames.

The film (view and stereo frames) may be prepared in a manner already described in connection with the verge and parallax-verge film, see Fig. 2 and Fig. 7; the printer of the latter figure may be used. Where the stereos appear as light-flashes (i. e., "stencilled" stereo frames), the stereo tracings—which may be made in the manner described in connection with the verge tracings, also using master tracings etc.—are not directly exposed to the film (at aperture 34, see Fig. 7) but a negative is first made of the tracing, in which the traced outlines appear as white lines on a black background. A reversing prism is used to prevent left to right reversals. It is this negative tracing which is exposed at the printer.

The range of vibration (parallax-verge or stereo) of the different component parts may be determined from the view frame or picture, such as the one shown in Fig. 9. The enlarged projected view on the ground glass table 16, Fig. 2, may be used in this determination. There is first found the horizon H—H (which is in this case, the natural horizon) and the vanishing point $i$ (or principal point, as in Fig. 5). The point where an object or figure rests on ground will be termed the "ground point," such as ground point $j$ of the flag J or ground point $k$ of soldier K. Next, lines are drawn from the principal point $i$ through the different ground points (lines $ij$ and $ik$) extended to reach the ground line G—G. The ground or base line G—G is the intersection of the vertical plane of the picture with the horizontal plane; the picture plane may be selected at a convenient distance between the objects or scene and the observer (the selection of which will be considered hereinafter). Conveniently, the bottom edge of the frame may be taken as the ground or base line, as has been done in Fig. 9. Line $ij$ intersects the base or ground line at point $q$; line $ik$ intersects the base line at point $r$. The points $r$ and $q$ on the ground line will be termed "pivotal points." Equal distances $i_1$ and $i_2$ are marked off on both sides of principal point $i$; the distance $i_1i_2$ on horizon H—H pre-determines the extent of vibration of all component parts of the picture. The point $i_1$ might be termed the "left principal point" and $i_2$, the "right principal point."

The pivotal points $r$ and $q$ are joined by straight lines to left and right principal points $i_1$ and $i_2$. A short line is drawn at each of the component parts, or rather at their ground points (as $j$ and $k$) parallel to the horizon and ground lines; the short line at $j$ is bounded at $j_1$ and $j_2$ where the line meets lines $qi_1$ and $qi_2$, while the short line at $k$ is bounded at $k_1$ and $k_2$. The lines $j_1j_2$ and $k_1k_2$ determine the extent of vibration (whether parallax-verge or stereo) of the various component picture parts and will be termed "vibration lines."

Referring back to Fig. 5, $f_1f_2$ and $n_1n_2$ are likewise "vibration lines." However, in Fig. 5 the position of these points was gotten by means of distance points $d_1$, $d$ and $d_2$ and points $f''$ and $n''$ on ground line. It was seen in the discussion of Fig. 5 that the vibration lines $f_1f_2$ and $n_1n_2$ were parallel to lines H—H and G—G. Hence the vibration lines may be simply gotten by drawing lines at the various ground points (such as $j$ and $k$) parallel to lines G—G and H—H, as has been done in constructing Fig. 9.

As was seen in connection with Fig. 5, the extent of vibration is in direct proportion to the distance of the object from the picture plane. Vibration line $j_1j_2$ is longer than $k_1k_2$ since object J is further removed from the picture plane (ground line GG) than object K.

The guide lines, such as $qi$, $qi_1$, $ri$, $ri_2$, etc. and the vibration lines $j_1j_2$, $k_1k_2$ may be conveniently laid out on the master tracing.

From a consideration of the positive film itself, more particularly, from the number of frames allotted to the contemplation of a scene, etc., there is determined the number of frames in a complete "series" or in a "vibration" or "sub-series." The vibration lines are divided off in accordance with the number of "steps" required in a complete vibration. Suppose for sake of illustration that there are but four frames assigned to a complete vibration; in this case there would be the following "step points" in the vibration lines: $j$, $j_2$, $j$, and $j_1$ or $k$, $k_2$, $k$ and $k_1$. Considering first the construction of stereo frames, in the first stereo frame the stereos will be in their central positions, points $j$ and $k$, the stereos being congruent with the objects to which they pertain. The first stereo tracing may therefore be derived by tracing directly over the master tracing. In the second stereo frame, the J stereo is shifted to $j_2$ and K stereo, to $k_2$. The fresh tracing (which is to become stereo tracing #2) is placed over the master tracing and dots marked thereon to indicate the ground points, such as $j$ and $k$. The tracing is then shifted, say first towards the right, until one of its "ground-dots," say the $j$-dot, coincides with one of the step points, which is the example taken, would be point $j_2$. Maintaining the tracings (fresh and master) in this shifted position, the stereo or outline of object J is traced. The tracing is then shifted until the $k$-dot coincides with step point $k_2$ of the master tracing, and the stereo of object K traced in this shifted position of the tracing. It is thus seen that in stereo tracing #2, the stereo of K has not been shifted as much as that of the further-removed object J. In like manner the remaining stereo tracings of the series are completed.

The parallax-verge tracings may be constructed in a similar manner, with the necessary changes due to differences in the two systems. For one thing, in constructing the different stepped verge tracings, outlines of the objects, i. e., in their unshifted positions, are duplicated in all tracings; only the half-perimeter, on one side or the other, is drawn (the right half in the case of step $j_2$, $k_2$ and the left half in the case of step $j_1$, $k_1$) so as to gauge the thickness of the parallax-verge, as has been herebefore described.

The method just explained with the aid of Fig. 9 may be used where the stereos or parallax-verges appear in separate frames, stereo or verge frames, and may also be used where the parallax-verges are directly incorporated in the view or picture frames.

The stereos (as was already seen above in connection with the verges or parallax-verges) may be directly incorporated in the view frames of the film. This may be done in a manner similar to that explained above, exposing the proper tracings at the same time as the contact printing of the corresponding view frame of the picture positive onto the virgin negative film, see Fig. 2; of course, instead of a simultaneous printing of the stereo and the picture, this may be done in successive runs. Where the stereos are incorporated directly on the view frames, the stereos preferably do not appear on every succeeding frame but are repeated a number of times per second below that required for persistency of vision. That is, while the view frames depict the picture on the screen, the stereos are preferably at a point below conscious recognition, and serves only to give plasticity or solidity to the picture. Film having stereos (or verges or parallax-verges) directly incorporated in the film frames may, of course, be projected by ordinary projecting machines.

Where the verges (or parallax-verges or stereos) are incorporated directly on the view frames, this addition of verges etc. may be made directly on the "master negative" film without the need of again printing the picture positive (together with the verges etc.) on virgin negative film. In this simplified process, a picture positive is first made from the master negative and used (by projection and enlargement, as already seen) in the preparation of the tracings. (As a matter of fact, such picture positive film is already available as it is usually made for other purposes.) The tracings are then printed on the corresponding frames of the master negative, see Fig. 2; the resulting negative film which might be termed the "verge" or "stereo negative," thus becomes the prototype of positive film made in accordance with this invention. The apparatus and set-up shown in Fig. 2 would be used as shown, except that instead of two films moving past the aperture 14, there would be one film, the master negative.

In the diagram of Fig. 5 both the principal point $i$ and the distance point $d$ have been displaced or vibrated through equal distance ($i_1 i_2$ equals $d_1 d_2$), in order to maintain $id$, $i_1 d_1$ etc. of constant length. The distance $id$, $i_1 d_1$ etc. is equal to, and measures, the distance the observer I, Fig. 4, is from the plane of the picture P—P (the distance IP'). Hence by maintaining the $id$ distance constant, the effect is the same as a displacement of the observer (I) on a line parallel to the picture plane, i. e., line $I_1 I_2$ is parallel to line P—P. The parallax-verge and stereo systems described are based upon such a construction (parallel displacement of I). By controlling other factors of the diagrams of Figs. 5 and 4 other types of systems may be evolved. One other of such possible systems will now be described.

Suppose the principal point $i$ remains fixed (i. e., is not displaced to $i_1$ and $i_2$) while the distance point $d$ is vibrated (between $d_1$ and $d_2$). In this case the lines $f''d_1$ and $f''d_2$ intersects the line $i$—$fn$ at $f_1'$ and $f_2'$, respectively, and the lines $n''d_1$ and $n''d_2$ intersect the line $i$—$fn$ at $n_1'$ and $n_2'$, respectively. That is, as the distance point $d$ is displaced between $d_1$ and $d_2$, the point $f'$, which is the perspective point of the far object $f$, Fig. 4, moves along the line $fn$—$i$ between the points $f_1'$ and $f_2'$; also the perspective point $n'$ of the near object $n$ moves along the line $fn$—$i$ between $n_1'$ and $n_2'$.

As already stated, the distance $id$, Fig. 5, is equal to the distance IP', Fig. 4, i. e., the distance the observer I is removed from the plane of the picture P—P, Fig. 4. The distance $d_1 i$ being less than $di$ and the point $i$ remaining fixed, the displacement of the distance point $d$ is the same as the movement of the observer I towards and away from the picture plane along a line (the line of sight I—S, Fig. 4) normal to the picture plane. It should also be noted that the line $fn$—$i$, Fig. 5, is the perspective of a line normal to the picture plane. It will be observed that the displacement or vibration of perspective points such as $f'$ and $n'$ is along the line $fn$—$i$, that is, normally to the plane of the picture. Hence, in order to distinguish from the stereo system previously considered, the system now being described (i. e., in which there is a displacement of the object or rather outline normally to the plane of the picture) will be termed the "normal-stereo" system, and the other (in which the object, or rather stereo, or parallax-verge is vibrated parallel to the plane of the picture) will be termed the "parallel-stereo" system.

A normal-stereo frame appears in Fig. 10, of course with the parts grossly exaggerated. A point is selected which is preferably the vanishing or principal point $i$ (on horizon HH); guide lines are drawn from point $i$ to the ground points ($a$ of figure A and $b$ of figure B) and also through the top points of the figures as shown. The guide lines (ground and top) are extended from point $i$ to, or towards, a selected picture plane, such as the picture plane located at the bottom edge of the frame (line G—G). Guide line $ia$ intersects GG at $ag$ and guide line $ib$ intersects GG at $bg$. The distance from the picture plane is the gauge of the proportional extent of "normal" (as defined above) vibration that is, the further away is the object, the greater the relative extent of vibration (i. e., relative to nearer objects). Hence, far object B will vibrate through a range which compares to the vibration range of near object A as $b$—$bg$ is to $a$—$ag$. Of course, the objects do not vibrate the entire distance of the objects to the selected picture plane, but only a very small percentage of that distance; in Fig. 10, it is assumed, merely for purposes of illustration, that the objects vibrate ⅕ of their respective distances from the picture plane. Far object B vibrates (of course, what is meant is that the stereo outline, not the object-image, "vibrates") between $b$ and $b'$, $bb'$ being ⅕ of $b$—$bg$; object A vibrates between $a$ and $a'$, $aa'$ being ⅕ of $a$—$ag$. It will be seen that the range of vibration $bb'$ of the far object B is greater than range $aa'$ of near object A, proportionally to their respective distances from the camera.

Stereo frames (similar to those shown in Fig. 8) are constructed for the series or the normal-stereos may be placed directly on the view frame, as was seen to be the case in the other types described. The vibration may be forward, i. e., towards the picture plane (to points $a'$ and $b'$) or it may be rearward, away from the picture plane (to points $a''$ and $b''$). Unlike the stereo, or rather parallel-stereo, type and the parallax-verge type, (in which the displacement is parallel to the picture plane), there is in the normal-stereo type of vibration an increase (and also a decrease, if there is rearward vibration) in the size of the outline. The stereo A' and B' are larger than the figures themselves. The position of the normal-stereo is determined by points—such as $a'$, $b'$ etc.—on the bottom or ground guide line; the size of the stereos or outlines is determined by both the top and bottom lines, as clearly appears in Fig. 10.

The normal-stereos may be produced from the picture positive in a manner similar to that above described in connection with the parallel-stereos. The range of vibration of the various objects is first determined as just described with reference to Fig. 10. These distances are divided into steps depending upon the number of frames etc., forming "vibration series" or "sub-series" (as defined hereinbefore). Tracings, including a master tracing, are formed and photographed in a manner above set forth. One difference should be noted, due to the fact that the size of the normal-stereos varies with the extent of displacement, see Fig. 10. In order that the size of the stereo or outline may be varied, the ground glass 16, see Fig. 11, and the objective 7 are adjustable so as to enlarge and reduce the size of the projection on the ground glass 16.

Still another system might be mentioned and that is where the distance point $d$ remains fixed and the principal point $i$ is displaced between $i_1$ and $i_2$. In this case, the vibration of the far object $f'$ will be between points $fd_1$ and $fd_2$ along the line $f''d$ and the vibration of the near object $n$ will be between points $nd_1$ and $nd_2$ along the line $n''d$. In addition, there may be combinations of the different systems.

The view frames or the verge or stereo frames may be further supplied with lines which are essential parts of the perspective of the picture and which would help to create the effect of three-dimensions in otherwise flat pictures. Such perspective lines are drawn from the orthographic projection of the component parts of the picture (in the vertical plane or picture plane) to the vanishing point or points. Such perspective lines, like the verges, stereos and parallax-verges, are not exhibited for sufficiently long periods of time to interfere with the retention (by persistency of vision) and visualization of the objects themselves; the perspective lines are flashed but momentarily, at wide intervals or alternations, upon the screen. The perspective lines are coordinated with the verges and stereos so as to further help create relief or plasticity in the picture.

In the parallax-verge system shown in Fig. 3, the thickness of the half-perimetric verges are increased proportionally to the distance of the objects from the camera, far objects (F) having thicker or wider parallax-verges than near objects (N). This may be reversed, as in the system shown in Fig. 3a, in which the nearer the object to the camera the wider is the range of pulsation of its verge width. The near figure N has a wider verge 41 than has far figure F, having a verge 41'. This system I have termed "shadow-verge," the effect being that of shadows cast by a light source in front of the objects and in front of the picture plane; the nearer the object is to the "light source," the greater will be its shadow effect. The object F being farther away from the "light source," its "shadow-verge" 41' is less than 41 of the near object N. The theory underlying "shadow-verges" is readily explained with the aid of Fig. 5, in which points $c_1$ and $c_2$ have been spaced off equal distances from point $n''$ and lines $c_1d$ and $c_2d$ drawn to distance point $d$. A line drawn at the perspective point of an object (such as at point $n'$) parallel to the ground and horizon lines GG and HH (such as the short line $n_1n_2$) bounded at its ends by the lines $c_1d$ and $c_2d$, defines the extent of shadow-verge vibration. The further the object is from the camera, i. e., the nearer it approaches the distance point $d$, the smaller will be the range of pulsation or widening of its shadow-verges (the lines $c_1d$ and $c_2d$ converge to the point $d$). The shadow-verges are constructed in a manner similar to that herein described in connection with the parallax-verges, the only difference being the reversed proportionality of verge pulsation.

I claim:

1. The method of producing motion picture film having frames depicting a particular view and a series of frames presenting outlines of different component parts of the view cyclically altered, which method comprises the steps of preparing a picture positive, projecting for enlargement single frames thereof, drawing a series of outline tracings from the said enlarged frame projections, successive ones of the said series having the outlines of component parts of the view cyclically altered depending upon the distance of the parts from the camera, printing the said tracings of the series on alternate frames of a master negative and printing the picture positive frames corresponding to individual ones of the said series on alternate frames of the said master negative film and in a fixed relation to the said series.

2. The method of producing motion picture film having frames depicting a particular view and a series of frames presenting outlines of different component parts of the view cyclically altered, which method comprises the steps of preparing a picture positive, projecting for enlargement single frames thereof, drawing a master tracing from the said enlarged frame projection by tracing the perimetric outlines of component parts of the view, overlaying the said master tracing with a fresh tracing, shifting the said fresh and master tracings relatively to each other toward one side extents depending upon distances of component parts of the view from the camera, and tracing the outlines of the different component parts in the said shifted positions to form the first tracing of a series, preparing the second tracing of the series in the same manner but with increased relative shifts in the same direction, and preparing the complete set of tracings by continuing the shifts in the said direction until maximum range of alteration and then progressively decreasing the relative shifts until minimum alteration and then increasing the shifts in the opposite direction.

3. The method of producing motion picture film having frames depicting a particular view and a series of frames presenting parallax-verge outlines of different component parts of the view cyclically widened, which method comprises the steps of preparing a picture positive, projecting for enlargement single frames thereof, drawing a master tracing from the said enlarged frame projection by tracing the perimetric outlines of component parts of the view, overlaying the said master tracing with a fresh tracing, retracing the outlines of the master tracing on the fresh tracing, shifting the said fresh and master tracings relatively to each other toward one side in accordance with the relative distances of component parts of the view from the camera, tracing the half-perimetric outlines of the component parts on the said side of shifting, in the said shifted position, and increasing the thickness of the outlines in accordance with the double lines thus formed in the said side of the component parts.

4. The method of producing motion picture film having a series of frames depicting a particular view and a series of frames having verges circumscribed around the perimeters of component parts of the view, which method comprises the steps of preparing a picture positive, projecting for enlargement single frames thereof, drawing verge tracings from the said enlarged frame projections, printing the said verge tracings on alternate frames of a master negative and printing the corresponding frames of the said picture positive on the other alternate frames of the said master negative.

5. The method of producing motion picture film having a series of frames depicting a particular view component parts of which are delineated by verges circumscribed around the perimeters of component parts of the view, which method comprises the steps of preparing a picture positive, projecting for enlargement single frames thereof, drawing verge tracings from the said enlarged frame projections, and printing the said verge tracings together with corresponding positive picture frames on a master negative film.

6. The method of treating photographic prints which consists in enlarging the picture, delineating component parts of the enlarged picture by a verge circumscribed around the periphery of said component parts, and re-printing said picture and said verge delineations.

7. The method of treating photographic prints which consists in delineating component parts of the picture by which a verge circumscribed around the periphery of the said component parts.

8. The method of exhibiting motion pictures comprising the step of projecting on the screen a series of frames depicting a particular view and the step of momentarily flashing in registering relation upon the screen alternately with the said view frames a series of related frames in which only the perimetric silhouettes but not the portions within the outlines of different component parts of the view are altered an extent depending upon the distance of the said component parts from the camera.

9. The method of exhibiting motion pictures comprising the step of projecting on the screen a series of frames depicting a particular view and the step of momentarily flashing in registering relation upon the screen alternately with the said view frames a series of related frames in which only the perimetric silhouettes but not the portions within the outlines of component parts of the view are delineated by verges circumscribed about their peripheries.

10. The method of exhibiting motion pictures comprising the step of projecting on the screen a successive series of frames depicting a particular view and the step of delineating only the perimetric silhouettes but not the portions within the outlines of component parts of the view projected on the screen by verges circumscribed around the peripheries of the component parts of the film frames.

11. Motion picture film comprising frames of views to be projected on the screen and frames associated therewith to give relief or depth to the said projected views, the said associated frames presenting outlines of different component parts of the view altered extents depending upon the particular frame and upon the distance of the component parts from the camera.

12. Motion picture film comprising frames of views to be projected on the screen and frames associated therewith to give relief or depth to the said projected views, the said associated frames presenting parallax-verges of different component parts of the view, perimetric outlines of which are of varying thicknesses towards one or the other side of the picture depending upon the particular frame and upon the distance of the component parts from the camera.

13. Motion picture film comprising frames of views to be projected on the screen and frames associated with the said projected views, the said associated frame presenting verges circumscribed around the perimeters of component parts of the view.

14. Motion picture film comprising frames of views to be projected on the screen, component parts thereof being delineated by verges circumscribed around their peripheries.

15. Photographic reproduction of a view or picture the component parts of which are delineated by verges circumscribed peripherally around said component parts.

16. In a device of the class described for exhibiting film having a series of view frames and a related series of outline frames, the combination of an objective train for each of the two said frame series, a shutter for the view frame objective having obscuring and anti-flicker blades separating wide-angle exposure openings and a shutter for the outline frame objective in the form of a solid disc having a single, small-angle opening.

17. The method of exhibiting motion pictures comprising the steps of providing a series of frames representing a particular view, delineating only the perimetric silhouettes but not the portions within the outlines of component parts thereof by verges circumscribed about their peripheries, the density and opacity of the verges being reduced proportionate to the distance of the component parts from the camera, and projecting the said frames on the screen.

18. The method of exhibiting motion pictures comprising the step of projecting on the screen a series of frames depicting a particular view and the step of momentarily flashing in registering relation upon the screen a series of related frames in which only the perimetric silhouettes but not the portions within the outlines of component parts of the view are altered an extent depending upon the distance of the said component parts from the camera.

19. The method of exhibiting motion pictures comprising the step of projecting on the screen a series of frames depicting a particular view and the step of projecting in registering relation on the screen a series of related frames in which only the perimetric silhouettes but not the portions within the outlines of component parts of the view are altered an extent depending upon the distance of the said component parts from the camera.

20. The method of exhibiting motion pictures in relief comprising the step of providing verges of component parts of a particular view, the step of projecting on the screen a series of frames depicting the said view and the step of varying the thickness of the said verges of predetermined frames cyclically to both sides in amplitudes depending upon the spatial disposition of the component parts.

21. The method of exhibiting motion picture films having a series of view frames and a related series of outline frames comprising the steps of passing light through a view frame to project the same on the screen, then obscuring the light passage and concomitantly and intermittently moving the film, and momentarily flashing a correlated outline frame during the said obscuration of the view frame.

22. The method of exhibiting motion pictures comprising the steps of projecting frames representing a view having foreground object or objects and a background, delineating component parts of the view with parallax-verges, cyclically increasing and decreasing the width of the parallax-verges and projecting the said frames and the said parallax-verges, whereby the background appears to be altered relative to the foreground object.

23. The method of exhibiting motion pictures comprising the steps of projecting a series of frames representing a particular view, delineating component parts thereof by verges circumscribed about their peripheries, decreasing the density and opacity of the verges of component parts proportionately with their distance from the camera and altering the thickness of the said verges proportionately to the said distances, and projecting the said frames on the screen.

24. The method of exhibiting motion pictures comprising the steps of projecting a series of frames representing a particular view, delineating component parts thereof by verges circumscribed about their peripheries, varying the thickness of the said verges alternately to both sides in amplitudes depending upon the spatial disposition of the component parts and varying the density and opacity of the said verges in dependence upon the said spatial disposition of the component parts.

25. The method of exhibiting motion pictures comprising the steps of providing a series of frames representing a particular view, delineating only the perimetric silhouettes but not the portions within the outlines of component parts thereof by verges circumscribed about their peripheries, altering the said verges according to the distance of the component parts from the camera and projecting the said frames on the screen.

26. The method of exhibiting motion pictures to obtain the effect of relief comprising the steps of providing a series of frames representing a view and a series of related frames in which the perimetric silhouettes but not interior portions within the outlines of component parts of the view have been altered, projecting the said series of view frames at a rate to depict the view on the screen and projecting the said series of outline frames in registering relation and at a rate below conscious recognition to give plasticity to the said depicted view.

27. The method of exhibiting motion pictures to obtain the effect of relief comprising the steps of providing a series of frames representing a view, altering only the perimetric silhouettes but not the portions within the outline of component parts thereof, projecting the said series of frames at a rate to depict the view on the screen, and projecting those of the said series of frames that have been altered at a rate below conscious recognition to give plasticity to the said depicted view.

28. The method of exhibiting motion pictures comprising the steps of providing a series of frames of a particular view, marking perspective lines on predetermined ones of the frames, projecting the said series of frames at a rate to depict the view on the screen, the said predetermined ones of the said series of frames that have been marked being projected at a rate below conscious recognition to give the effect of relief to the said depicted view.

29. The method of exhibiting motion pictures in relief comprising the steps of providing a series of frames depicting a particular view and a series of related frames of stereos of component parts of the said view, the said stereos being shifted to left and right to an extent depending upon the distance of the component parts from the camera, and projecting both series of frames whereby the stereos appear to vibrate at amplitudes depending upon the said distances.

30. The method of exhibiting motion pictures in relief comprising the steps of providing a series of frames depicting a particular view, providing verges of component parts of the view on predetermined ones of the said series of frames, the breadth of the said verges cyclically varying to left and right to an extent depending upon the distance of the component parts from the camera, and projecting the said series of frames whereby the verges appear to vibrate at amplitudes depending upon the said distances.

31. The method of exhibiting motion pictures in relief comprising the step of providing a verge about an object represented in a particular view, the step of projecting on the screen a series of frames depicting the said view and the step of varying to a predetermined amplitude the thickness of the said verge of predetermined frames cyclically to both sides, whereby the verge appears to vibrate at the said amplitude.

32. The method of exhibiting motion pictures comprising the steps of photographing a view representing a foreground object or objects and a background, altering independently of the motion of the object only the perimetric silhouette but not the portions within the outline of the object by outwardly widening predetermined portions of the said perimetric silhouette whereby the background is changed relatively to the foreground object, and projecting the said view on the screen.

33. The method of claim 32 wherein the said perimetric silhouette is altered cyclically.

34. The method of claim 32 wherein the extent of background alteration depends upon the distance of the object from the camera.

35. The method of exhibiting motion pictures comprising the steps of photographing a series of frames depicting a particular view, preparing therefrom a series of related frames by delineating only the perimetric silhouettes but not the portions within the outlines of component parts of the view by circumscribing verges around the perimetric silhouettes, and projecting the said series of view and related frames.

36. The method of exhibiting motion pictures comprising the steps of photographing a series of frames depicting a particular view, preparing therefrom a series of related frames by altering only the perimetric silhouettes but not the portions within component parts of the view by outwardly widening predetermined portions of the said perimetric silhouettes, and projecting the said series of view and related frames.

37. The method of exhibiting motion pictures comprising the steps of providing a series of frames of a particular view, delineating the entire periphery but not portions within the periphery of component parts of the view by circumscribing a dark line around the said periphery, and projecting the said series of frames on the screen.

38. The method of exhibiting motion pictures comprising the steps of providing a series of frames of a particular view, delineating the entire periphery but not portions within the periphery of component parts of the view by circumscribing a stencil-like line around the said periphery, and projecting the said series of frames on the screen.

39. The method of producing motion picture film having a series of frames depicting a particular view component parts of which are delineated by verges circumscribed around the peripheries of component parts of the view, which method comprises the steps of preparing negative film and a picture positive thereof, projecting for enlargement single frames of the picture positive, drawing verge tracings from the said enlarged frame projections and printing the said verge tracings on the corresponding frames of the negative film.

40. The method of treating photographic prints which consists in enlarging the picture, delineating component parts of the enlarged picture by a verge circumscribed around the periphery of said component parts, and printing said verge delineation on the said picture.

41. The method of producing motion picture film having frames depicting a particular view comprising projecting for enlargement single frames thereof, preparing verge tracings from the said enlarged frame projections by delineating verges around the perimeters of component parts of the view with density or opacity dependent upon the distance of the component parts from the camera, and associating the said verge tracings with corresponding frames of the film.

42. The method of cinematography which comprises the taking of scenes on photographic film, projecting successive frames thereof for enlargement to a convenient size, using the said projected enlarged frame as a guide for marking on a suitable medium, and incorporating the said markings with the corresponding frames of the photographed scenes on a finished photographic film.

43. The method of producing motion picture film of a view having foreground object or objects and a background wherein the background appears to be altered relative to the foreground object, which method comprises the taking of negative film in the usual manner and delineating component parts of the view of the frames thereof with parallax-verges, the width of the parallax-verges of far objects constituting a background being cyclically increased and decreased on alternate sides to alter the background relative to near objects.

44. Motion picture film comprising a series of frames of a view to be projected on the screen, component parts thereof being delineated by verges circumscribed around their peripheries, the said verges being cyclically altered in the said series, the extent of alteration depending upon the distance of the component parts from the camera.

45. Motion picture film according to claim 44 wherein the verges are cyclically altered by progressive widening toward alternate sides, the extent of verge widening depending upon the distance of the component parts from the camera.

46. Motion picture film comprising a series of frames of views to be projected on the screen and a series of frames associated therewith to give relief or depth to the said projected views, the said associated frames presenting stereos of different component parts of the view progressively shifted towards alternate sides extents depending upon the distance of the component parts from the camera.

47. Motion picture film comprising a series of frames of views to be projected on the screen and a series of frames associated therewith to give relief or depth to the said projected views, the said associated frames presenting normal-stereos of different component parts of the view progressively shifted relatively to the camera extents depending upon the distance of the component parts from the camera.

48. The method of producing motion picture film which when projected in the usual way in a motion picture projector will give the effect of three-dimensions, which method comprises the steps of exposing motion picture film in the usual way in a motion picture camera and developing the said film, moving the developed film stepwise through an enlarging device to successively enlarge the individual frames of the film to convenient size, drawing shading lines around the main outline of the essential features of the picture represented by a film frame on a tracing medium, and progressively projecting back the tracings of each frame upon the frames to which they correspond.

LEON H. AMDUR.